US008496551B2

(12) United States Patent
Mueller et al.

(10) Patent No.: US 8,496,551 B2
(45) Date of Patent: Jul. 30, 2013

(54) CONTINUOUS VARIABLE CLUTCH

(75) Inventors: Michael A. Mueller, Bemidji, MN (US); Brandon J. Engen, Clearbrook, MN (US); Brandon R. Bonham, Bemidji, MN (US); Shane C. Okeson, Bagley, MN (US); Stephen James Molde, Park Rapids, MN (US)

(73) Assignee: TEAM Industries, Inc., Bagley, MN (US)

( * ) Notice: Subject to any disclaimer, the term of this patent is extended or adjusted under 35 U.S.C. 154(b) by 129 days.

(21) Appl. No.: 12/722,919

(22) Filed: Mar. 12, 2010

(65) Prior Publication Data

US 2011/0220453 A1   Sep. 15, 2011

(51) Int. Cl.
*F16D 41/20* (2006.01)
*F16F 15/00* (2006.01)

(52) U.S. Cl.
USPC ............................................................ 474/17

(58) Field of Classification Search
USPC ............................. 474/17, 18, 19, 20, 21, 46
See application file for complete search history.

(56) References Cited

U.S. PATENT DOCUMENTS

| | | | |
|---|---|---|---|
| 2,521,457 A | 9/1950 | Heyer | |
| 3,195,364 A | 7/1965 | Pauli | |
| 3,698,828 A | 10/1972 | Maus et al. | |
| 3,757,593 A | 9/1973 | Svenson | |
| 3,916,707 A | 11/1975 | Wells | |
| 3,939,720 A | 2/1976 | Aaen et al. | |
| 3,996,811 A | 12/1976 | Reese | |
| 4,027,544 A | 6/1977 | Kobayashi | |
| 4,196,641 A | 4/1980 | Vogel | |
| 4,380,444 A | 4/1983 | Dolza | |
| 4,523,917 A | 6/1985 | Schildt | |
| 4,585,429 A | 4/1986 | Marier | |
| 4,611,702 A | 9/1986 | Kayakabe et al. | |
| 4,969,856 A | 11/1990 | Miyata et al. | |
| 5,209,703 A | 5/1993 | Mastine et al. | |
| 5,254,041 A | 10/1993 | Duclo | |

(Continued)

FOREIGN PATENT DOCUMENTS

JP            1-279154        11/1989

OTHER PUBLICATIONS

International Search Report from Serial No. PCT/US2010/050503 mailed Nov. 19, 2010.

(Continued)

*Primary Examiner* — William E Dondero
*Assistant Examiner* — Mark K Buse
(74) *Attorney, Agent, or Firm* — IPLM Group, P.A.

(57) ABSTRACT

A continuous variable clutch is provided. The continuous variable clutch includes a first sheave member and a second sheave member. The first sheave member includes a first central hub and a first conical-faced surface extending radially from the first central hub. The second sheave member includes a second central hub and a second conical-faced surface that extends radially from the second central hub. The second central hub of the second sheave member is received in a cavity of the first central hub such that the first conical-faced surface of the first sheave member facing the second conical-faced surface of the second sheave portion. The second central hub moving axially within the first central hub based on an amount of torque on the continuous variable clutch. The first sheave member and the second sheave member further forming a central passage to receive an input shaft of a transmission.

9 Claims, 14 Drawing Sheets

U.S. PATENT DOCUMENTS

| | | | |
|---|---|---|---|
| 5,326,330 A | 7/1994 | Bostelmann | |
| 5,341,698 A | 8/1994 | Tseng | |
| 5,421,784 A | 6/1995 | Robert | |
| 5,460,575 A | 10/1995 | Berto | |
| 5,516,333 A | 5/1996 | Benson | |
| 5,562,555 A | 10/1996 | Peterson | |
| 5,580,324 A | 12/1996 | Landry | |
| 5,647,810 A | 7/1997 | Huddleston | |
| 5,692,982 A | 12/1997 | Peterson | |
| 5,720,681 A | 2/1998 | Benson | |
| 5,906,258 A | 5/1999 | Kimura et al. | |
| 5,967,286 A | 10/1999 | Hokanson et al. | |
| 6,039,163 A | 3/2000 | Bassett et al. | |
| 6,120,399 A | 9/2000 | Okeson et al. | |
| 6,146,295 A | 11/2000 | Mor et al. | |
| 6,149,540 A | 11/2000 | Johnson et al. | |
| 6,354,419 B1 | 3/2002 | Dalbiez et al. | |
| 6,569,043 B2 * | 5/2003 | Younggren et al. | 474/19 |
| 6,743,129 B1 * | 6/2004 | Younggren et al. | 474/19 |
| 6,837,353 B2 * | 1/2005 | Watt | 192/54.52 |
| 7,081,057 B2 * | 7/2006 | Kalies | 474/19 |
| 7,614,970 B2 * | 11/2009 | Teijido et al. | 474/46 |
| 8,100,791 B2 * | 1/2012 | Yamaguchi et al. | 474/28 |
| 2002/0033295 A1 | 3/2002 | Korenjak et al. | |
| 2002/0065156 A1 * | 5/2002 | Younggren et al. | 474/19 |
| 2002/0065157 A1 * | 5/2002 | Heinrich et al. | 474/19 |
| 2002/0123400 A1 * | 9/2002 | Younggren et al. | 474/14 |
| 2008/0102997 A1 * | 5/2008 | Ho | 474/17 |

OTHER PUBLICATIONS

International Search Report from corresponding International Application Serial No. PCT/US2011/020623, mailed May 6, 2011.

"Found, the Missing Half of the Secondary Clutch". New SnowTech Magazine. Sep. 1997, pp. 114-119.

European Search Report of European Patent Application No. EP10823820.5 mailed Mar. 22, 2013, 5 pages.

\* cited by examiner

CONTINUOUS VARIABLE CLUTCH

BACKGROUND

A typical driven clutch sheave includes two sheave members. The first sheave member is called the stationary sheave member because it is locked to a post or shaft. The other sheave member is called moveable because it translates along the axis of the post or shaft. Typically a cam having a cam angle profile is attached to or incorporated into the moveable sheave member. The cam profile is for torque sensing. As the moveable sheave member translates along the shaft or post axis, the moveable sheave member rotates about the post and slides linearly closer to or farther away from the stationary sheave member due to the cam profile and a spring force to form a sheave that is continuous variable clutch (CVC). A CVC delivers torque by squeezing a belt tight enough to prevent slipping. The cam profile allows for the CVC to be torque sensing. The more torque that is put into the CVC the tighter the CVC squeezes the belt. This will shift the CVC into a lower ratio. Likewise when the torque drops, the CVC exerts less belt squeeze because a reaction force in the cam allows the CVC to shift into a higher ratio. Hence, the CVC has torque sensing capabilities.

For the reasons stated above and for other reasons stated below which will become apparent to those skilled in the art upon reading and understanding the present specification, there is a need in the art for a more cost effective and efficient driven CVC.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a continuous variable clutch is provided. The continuous variable clutch includes a first sheave member and a second sheave member. The first sheave member includes a first central hub and a first conical-faced surface extending radially from the first central hub. The first central hub forms a cavity. The second sheave member includes a second central hub and a second conical-faced surface that extends radially from the second central hub. The second central hub of the second sheave member is received in the cavity of the first central hub such that the first conical-faced surface of the first sheave member faces the second conical-faced surface of the second sheave portion. The second central hub of the second sheave member is further configured to move axially within the first central hub of the first sheave member based on the amount of torque on the continuous variable clutch to vary a gap distance between the first and second conical-faced surfaces. In addition, the first sheave member and the second sheave member further form a central passage to receive an input shaft of a transmission.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide continuous variable clutches (CVCs) without a sheave member of the CVC being coupled stationary to a center post. In embodiments, sheave members are designed to be in direct rotational communication with a transmission shaft. In particular, embodiments of the clutches form a central passage that is designed to engage an input shaft of a transmission. Benefits of this design include the use of smaller central passages through the CVC. This provides better length to diameter ratio of bushing used in the CVC, reduced costs since the post is no longer needed, a reduction in weight of about 15% over a typical CVC, less rotational inertia which results in a better response and better overall performance than a typical CVC. A further advantage of embodiments, as further discussed below, is that embodiments of the CVC can be pre-balanced as a unit before they are coupled to a transmission. Hence, they can be shipped pre-balanced and then simply coupled to a transmission at a remote location without the need for matched sets of balanced sheaves.

Figures 1A, 1B:
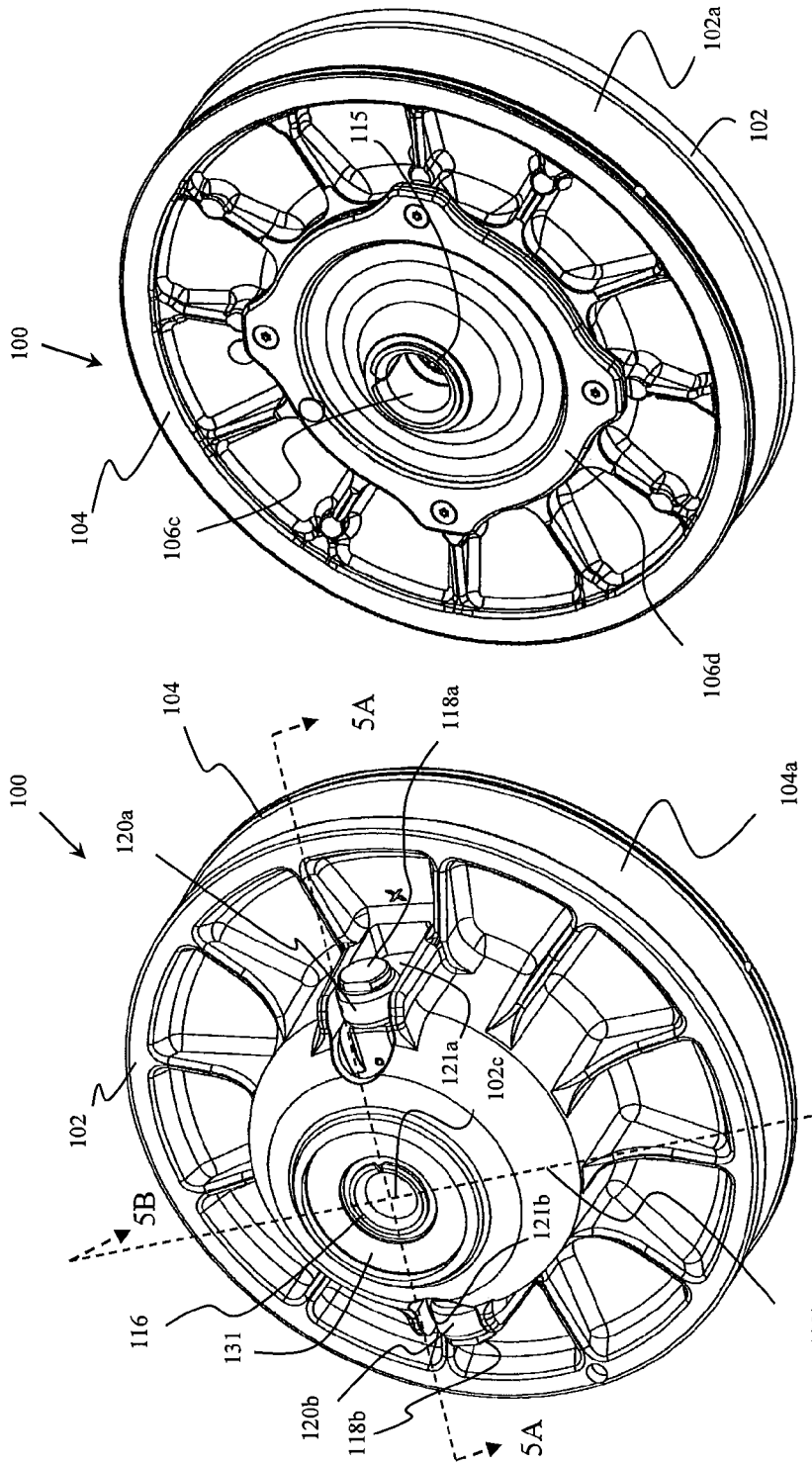
FIG. 1A is a front perspective view of a continuous variable clutch of one embodiment of the present invention.
FIG. 1B is a back perspective view of the clutch of FIG. 1A.
Figure 2:
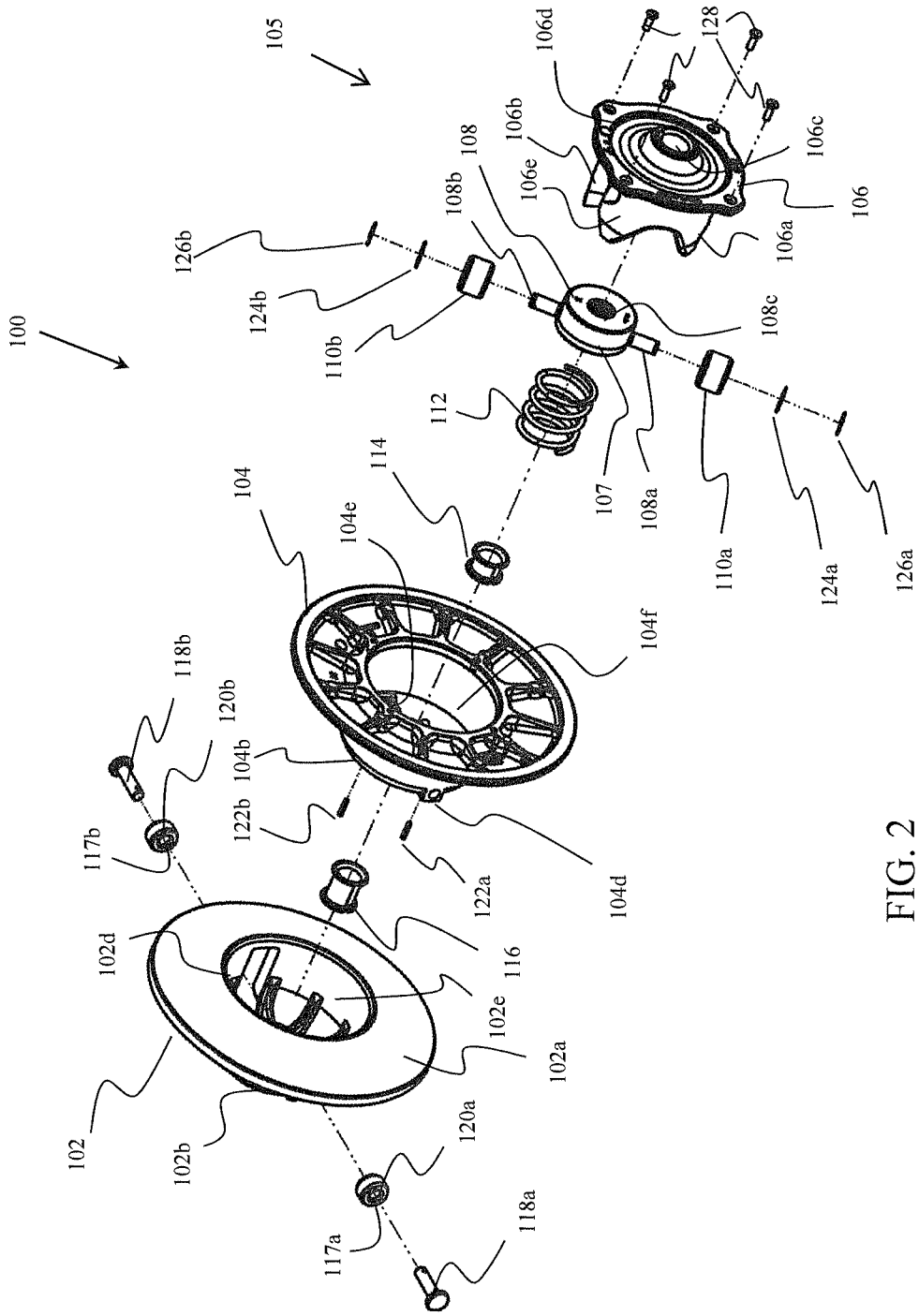
FIG. 2 is a side perspective view of the unassembled clutch of FIG. 1.

FIGS. 1A, 1B and 2 illustrate an embodiment of a CVC 100 with no relative motion. In particular, FIG. 1A is a front perspective view of the CVC 100 and FIG. 1B is a back view of the CVC 100. FIG. 2 is an unassembled side view of the CVC 100. With a clutch 100 with no relative motion, the sheaves 102 and 104 of the clutch are tied together to prevent rotation between the sheaves 102 and 104. If rotation is present, undesirable friction between the faces of a belt engaging the sheaves 102 and 104 can be present. This friction loss is called belt smear. This smearing is detrimental to belt life and is a performance and efficiency loss.

Clutch 100 includes a first sheave member 102 and a second sheave member 104. In embodiments, the second sheave member 104 selectively moves longitudinally (axially) in relation to the first sheave member 102 as discussed further below. The first sheave member 102 includes a first central hub 102b having a first central opening 102d to a chamber 102e and a first conical faced surface 102a. The first conical faced surface 102a extends radially from the first central hub 102b about the central opening 102d. Moreover, the first central hub 102b extends from the first central opening 102d in generally a direction that is perpendicular in relation to the first conical faced surface 102a. Further, the first conical faced surface 102a faces a direction that is opposite from the direction the first central hub 102b extends from the first central opening 102d. The second sheave member 104 includes a second central hub 104b having a first central opening 104e and a second conical faced surface 104a. The second conical faced surface 104a extends radially from the first central opening 104e of the second central hub 104b. Moreover, the second central hub 104b extends from the first central opening 104e in generally a direction that is perpendicular in relation to the second conical faced surface 104a. Further the second conical faced surface 104a of the second sheave member 104 faces the direction the second central hub 104b extends from the first central opening 104e of the second conical faced surface 104a. The second central hub 104b of the second sheave member 104 is positioned in the first central hub 102b of the first sheave member 102 such that the first conical faced surface 102a of the first sheave member 102 faces the second conical faced member 104a of the second conical member 104.

Figures 5A, 5B:
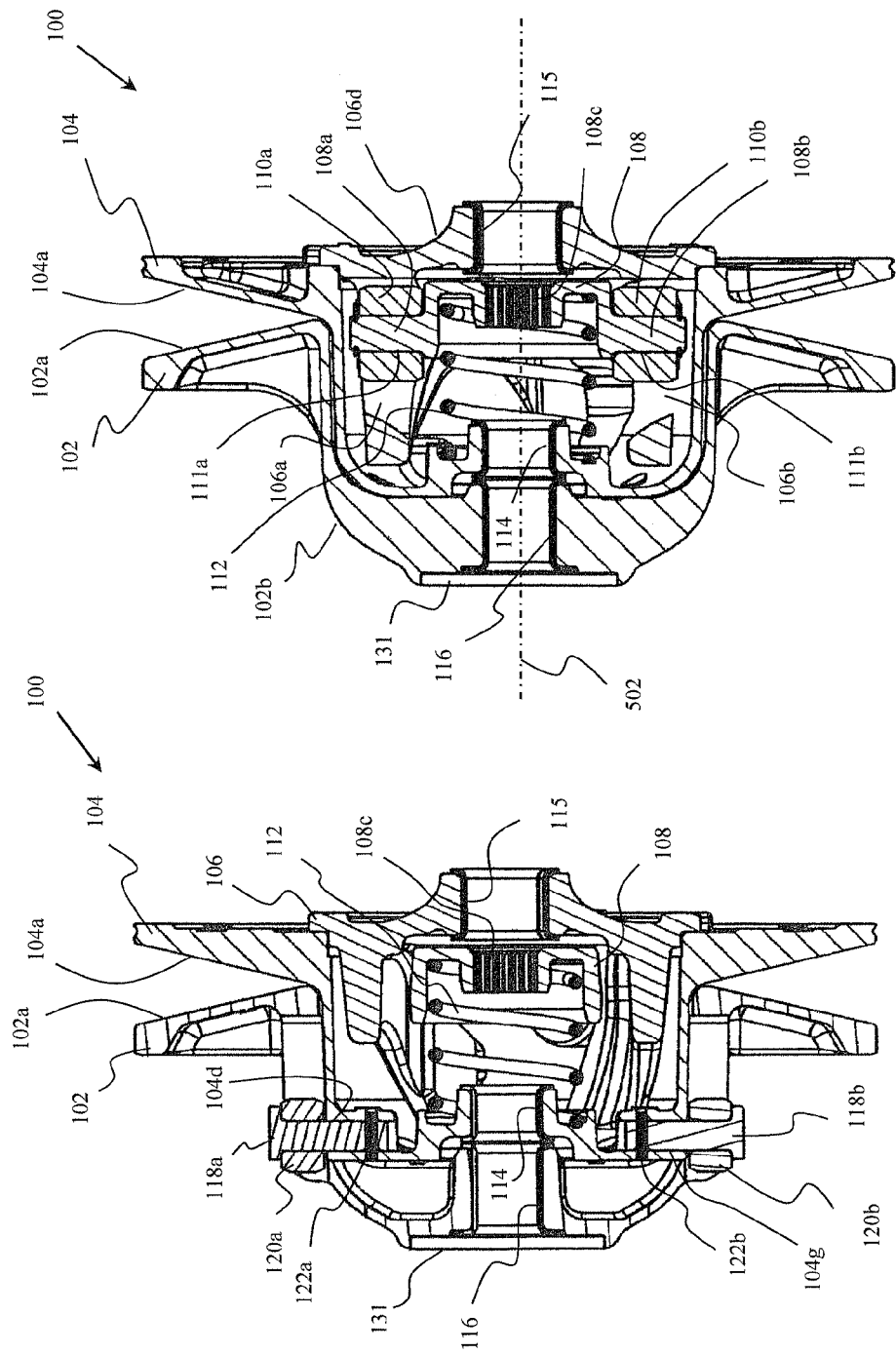
FIG. 5A is a cross-sectional side view of the assembled clutch of FIG. 1 along line 5A-5A, illustrating sheave roller clutch positioning.
FIG. 5B is a cross-sectional side view of the assembled clutch of FIG. 1 along line 5B-5B, illustrating cam roller clutch positioning.

Referring to FIG. 1A, the first central hub 102b of the first sheave member 102 has a second hub central opening 102c. The first central hub 102b of the first sheave member 102 further has opposed first and second side slots 121a and 121b. A first sheave roller 120a is received in the first side slot 121a and a second sheave roller 120b is received in the second side slot 121b. The first and second sheave rollers 120a and 120b are further discussed below. As FIG. 1B illustrates, a cam cover 106d of a cam assembly 106 is coupled to the second sheave member 104. Referring to the unassembled view of FIG. 2, the second central hub 104b of the second sheave member 104 is designed to be received in a cavity 102e formed by the first central hub 102b of the first sheave member 102 as discussed above. The second central hub 104b includes opposed first and second bores 104d and 104g (104g is illustrated in FIG. 5A). The bores 104d and 104g are aligned with slots 121a and 121b of the first central hub 102b of the first sheave member 102. The first sheave roller 120a that is received in the first side slot 121a of the first sheave member 102 includes a first sheave roller central passage 117a. The second sheave roller 120b that is received in the second side slot 121b of the first sheave member 102 includes a second sheave roller central passage 117b. A first sheave roller clutch fastener 118a passes through the first sheave roller central passage 117a of the first sheave roller 120a and into the first bore 104d in the second hub 104b of the second sheave member 104. A second roller fastener 118b passes through the second sheave roller central passage 117b of the second sheave roller 120b and into the second bore 104g in the second hub 104b of the second sheave member 104. Pins 122a and 122b are then inserted through respective apertures in the fasteners 118a and 118b and portions of the second central hub 104b to retain the fasteners 118a and 118b in the second sheave member 104 as further illustrated in FIG. 5A. This operatively forms a connector that connects the first sheave member 102 to the second sheave member 104 via the first and second sheave rollers 120a and 120b. This connection allows longitudinal movement between the first and second sheave portions 102 and 104 while preventing rotational movement between the first and second sheave portions 102 and 104. Hence the first and second sheave members 102 and 104 rotate together without relative rotation as the second sheave member 104 moves longitudinally. This embodiment helps prevent belt smear.

An adjustment assembly 105 is used to selectively provide the longitudinal (axial) movement of the second conical face surface 104a of the second sheave member 104 in relation to the first conical face surface 102a of the first sheave member 102. In the embodiment illustrated in FIG. 2, the adjustment assembly 105 includes a cam assembly 106, a cylindrical spider 108 and a biasing member 112. The cam assembly 106 includes a cylindrical cam portion 106e that extends from cam cover 106d. The cam portion 106e has first and second cam slots 106a and 106b. The first and second cam slots 106a and 106b have respective cam profile surfaces 302 and 304 (cam profiles) discussed fluffier below. The cam cover 106d is coupled to the second sheave member 104 by a plurality of fasteners 128. The cylindrical spider 108 has opposed first and second shafts 108a and 108b. The first and second shafts 108a and 108b extend outward from an outer surface 107 of the spider 108. The spider 108 further includes a central spider passage 108c. An inner surface of the spider 108 that defines the central spider passage 108c includes a plurality of grooves that form internal gears (i.e. internal splines) configured to engage exterior splines on an input shaft of a transmission.

The adjustment assembly 105 further includes a first cam roller 110a. The first cam roller 110a includes a first cam central passage 111a (shown in FIG. 5B). The first shaft 108a of the spider 108 is received in the first cam central passage 111a of the first cam roller 110a. The first cam roller 110a is further received in the first cam slot 106a of the cam portion 106e of the cam assembly 106. A first cam roller fastener includes a first C-clip 126a and washer 124a engages the first shaft 108a of the spider 108 to retain the first cam roller clutch 110a on the first shaft 108. The adjustment assembly 105 also includes a second cam roller 110b (shown in FIG. 5B). The second cam roller 110b includes a second cam central passage 111b. The second shaft 108b of the spider 108 is received in the second cam passage 111b of the second cam roller 110b. The second cam roller 110b further is received in the second cam slot 106b of the cam portion 106e of the cam assembly 106. A second cam roller fastener includes a second C-clip 126b and a second washer 124b that engage the second shaft 108b of the spider 108 to retain the second cam roller 110b on the second shaft 108b of the spider 108. A biasing member 112 is positioned between an inner surface of the second hub 104b of the second sheave member 104 and a surface of the spider 108. The biasing member 112 exerts a biasing force on the spider 108 to position the second conical face surface 104a of the second sheave member 104 near the first conical face surface 102a of the first sheave member 102. The second hub 104b of the second sheave member 104 forms a chamber 104f. The cam portion 106e of the cam assembly 106, the spider 108, the cam rollers 110a and 110b and the biasing member 112 are received in chamber 104f of the second sheave member 104.

Figure 3:
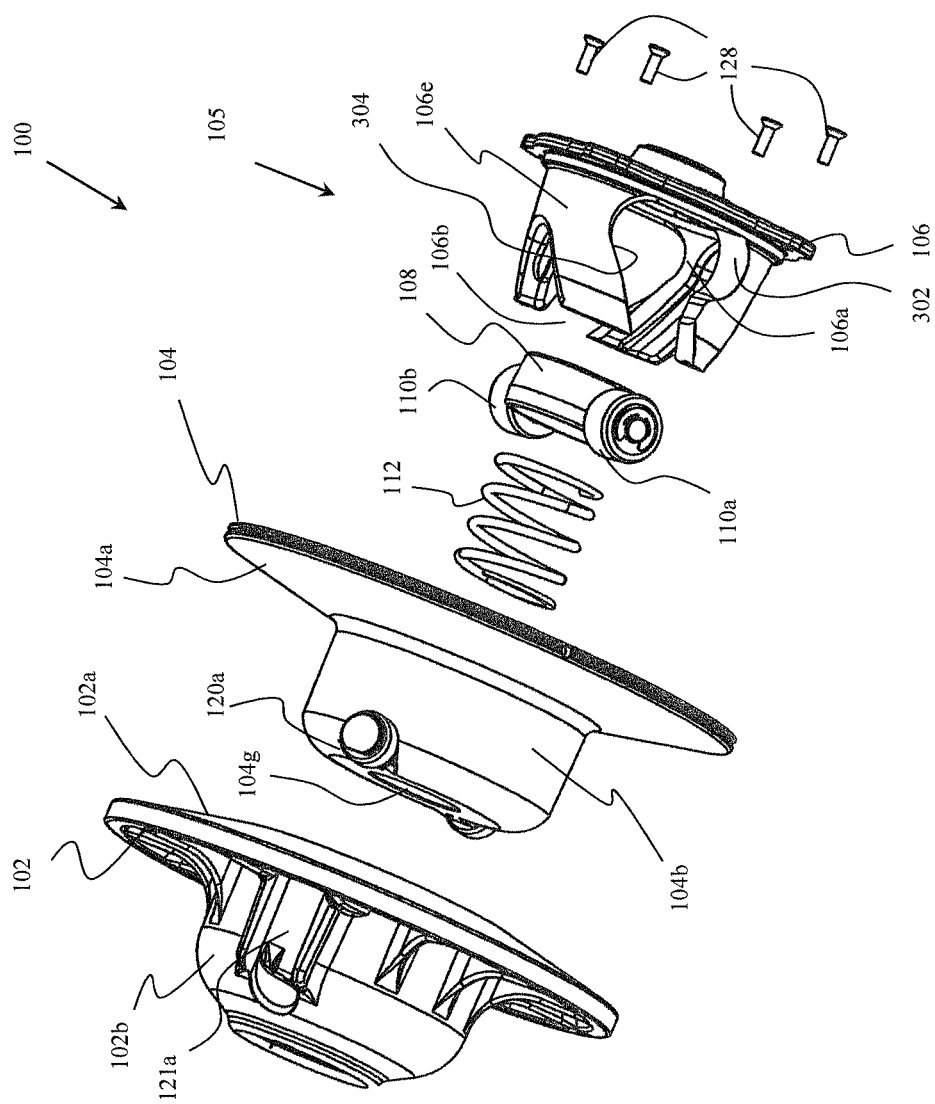
FIG. 3 is a side perspective partially unassembled view of the clutch of FIG. 1.
Figure 4:
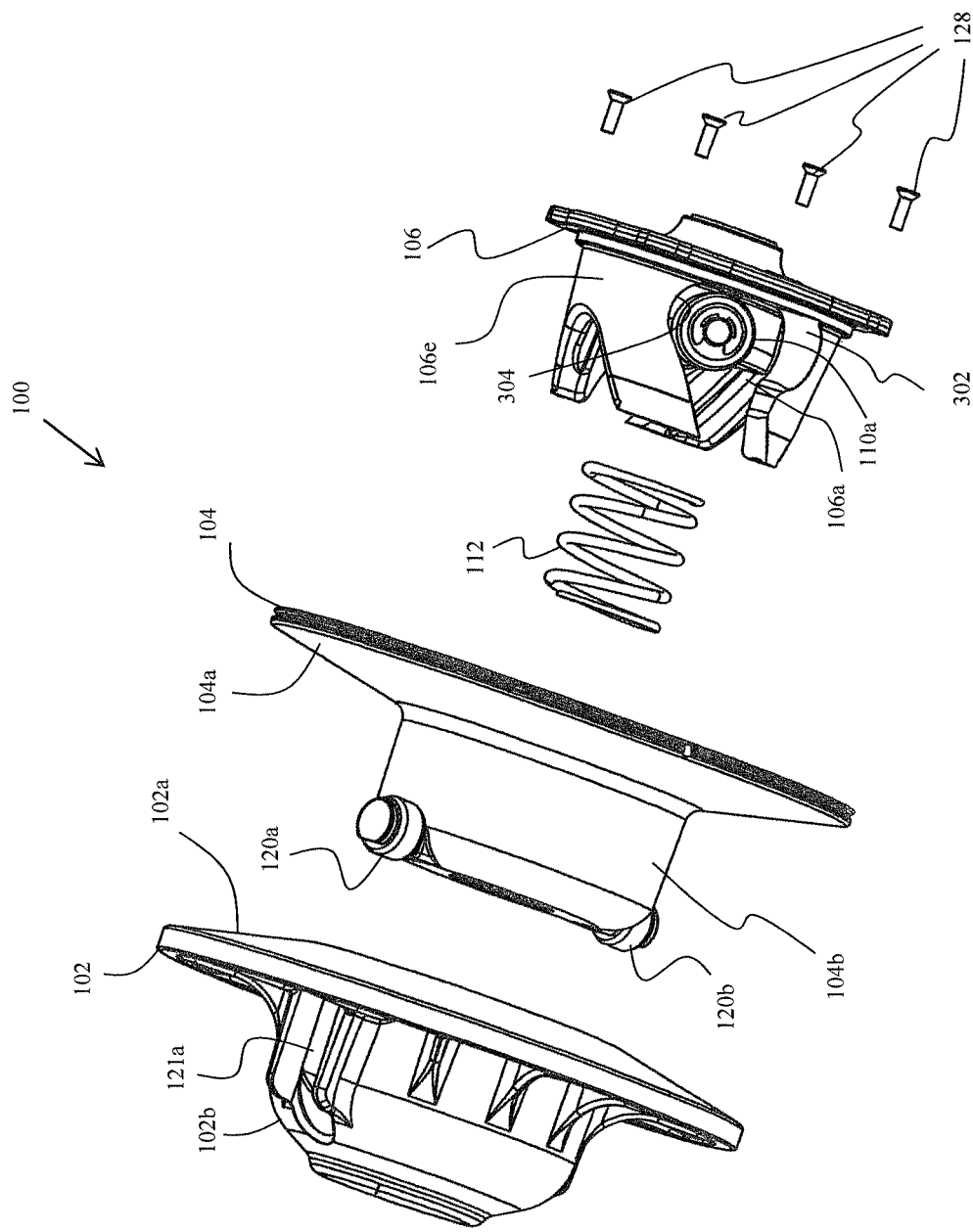
FIG. 4 is another side perspective partially unassembled view of the clutch of FIG. 1.

Referring to FIG. 3, a side perspective partially unassembled view of the clutch with no relative motion 100 is illustrated. As illustrated, the second hub 104b of the second sheave member 104 is positioned to be received in chamber 102e of the first hub 102a of the first sheave member 102. Also illustrated, are the first cam roller 110a and the second cam roller 110b of the spider 108 respectfully aligned with cam slots 106a and 106b of the cam assembly 106. In FIG. 4, the spider 108 is illustrated as being inserted within the cam portion 106e of the cam assembly 106 with roller clutches 110a and 110 respectively positioned in cam slots 106a and 106b of the cam portion 106e of the cam assembly 106. Each of the cam slots 106a and 106b includes opposed cam slot surfaces 302 and 304 in which the respective cam rollers 110a and 110b can engage. The first cam slot surface 304 is engaged when an engine (not shown) is driving a vehicle (not shown) containing clutch 100. The second cam slot surface 302 is engaged when the vehicle is implementing engine braking. By changing the cam slot surface 302 profile, the amount of engine braking can be varied. Further discussion of the effect of the cam slot surfaces 302 and 304 are described in commonly assigned U.S. Pat. No. 6,743,129 which is incorporated in its entirety herein.

FIG. 5A illustrates a cross-sectional side view of an assembled clutch with no relative motion 100. In particular, FIG. 5A illustrates pins 122a and 122b that retain fasteners 104d and 104g in the second sheave member 104. As discussed above, fasteners 104d and 104g retain the respective first and second sheave rollers 120a and 120b in the slots 121a and 121b of the first central hub 102b of the first sheave member 102 to slidably couple the first sheave member 102 to the second sheave member 104. FIG. 5A also illustrates the positioning of bearing 116 about opening 102c of the first central hub 102b, bearing 114 in a second central opening 104g (shown in FIG. 3) of the second central hub 104b and bearing 115 in opening 106c of the cam 106. The bearings 116, 114 and 115 engage different portions of an input shaft 700 of a transmission which is further discussed below in regards to FIGS. 7A and 7B. FIG. 5A also illustrates a sheave pocket 131 that is designed to receive a thrust bushing 154 and load washer 152 (illustrated in FIG. 7B) that help retain the clutch 100 on a transmission shaft due to axial forces.

Figure 5C:
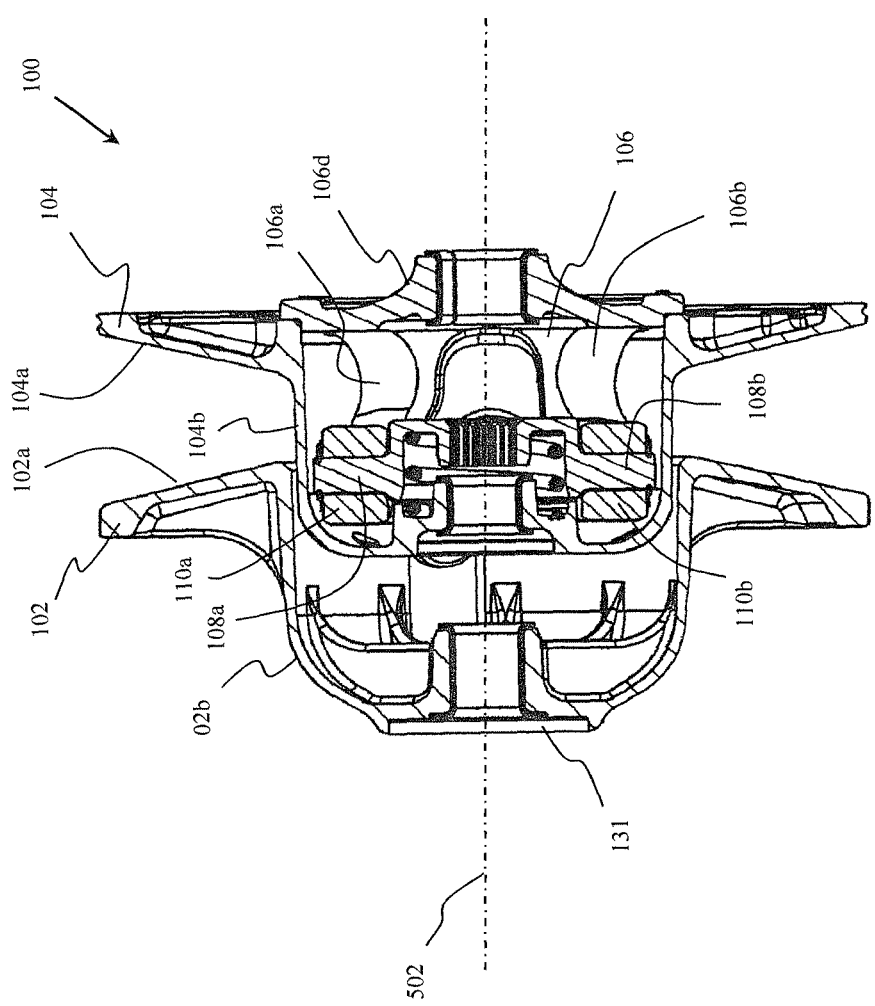
FIG. 5C is a cross-sectional side view of an assembled clutch of FIG. 1, illustrating the clutch in high gear positioning.

FIG. 5B further illustrates the cross-sectional side view of an assembled clutch with no relative motion 100. This view illustrates the positioning of the first and second roller clutches 110a and 110b in the respective first and second cam slots 106a and 106b of the cam 106. In this position, the clutch 100 is set for low gearing with the first and second conically faced surfaces 102a and 104a of the first and second sheave members 102 and 104 positioned close to each other so a drive belt (not shown) will ride high up on the respective first and second conical faced surfaces 102a and 104a away from a central longitudinal axis 502 of the clutch 100. The drive belt may be an endless V-shaped belt known in the art that connects a drive element to a driven clutch such as clutch 100. In the position illustrated in FIG. 5B, the biasing member 112 is extended pushing the spider 108 away from an inner front surface of the second central hub 104b of the second sheave member 104 which in turn positions the first and second conical faced surface next to each other. FIG. 5C illustrated the clutch 100 in a high gearing configuration where a drive belt (not shown) would ride low (closer to the longitudinal axis 502) on the first and second conical faced surfaces 102a and 104a or even ride solely on the second central hub 104b of the second sheave member 104. In this position, the first and second rollers 110a and 110b have moved in cam surfaces defined by the cam slots 106a and 106b of the cam 106 thereby compressing biasing member 112. Rotational forces delivered by the drive belt (not shown) move the first and second rollers 110a and 110b in cam profile surfaces (cam profile) defined by the cam slots 106a and 106b of the cam 106 to counter the biasing force of the biasing member 112. The cam profile and the biasing member 112 work together as a torque sensing unit. The biasing member 112 in this embodiment is a spring.

Figure 6:
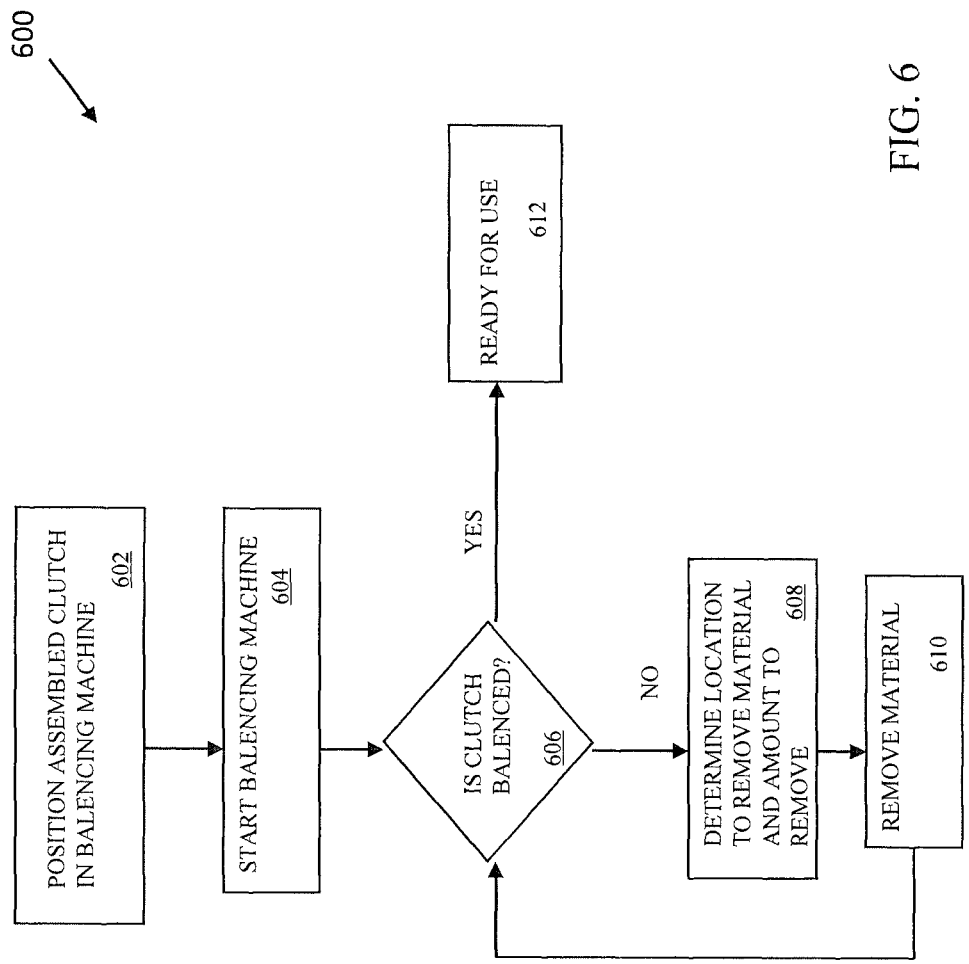
FIG. 6 is a balancing flow diagram of one embodiment of the present invention.

In practice, once the clutch 100 has been assembled, it can be balanced before it leaves the manufacture. Referring to FIG. 6 a balancing flow diagram 600 of one embodiment is illustrated. The clutch 100 is temporally mounted on a test shaft in balancing machine 602. The conical-shaped faces 102a and 104a of the sheaves 102 and 104 are positioned a select distance away from each other (almost a full open position). The rotational shaft holding the clutch 100 is rotated (604). The balancing machine measures any imbalance in single or multiple planes near each sheave 102 and 104 (606). If an imbalance is detected (606), the balancing machine determines the location to remove material and the amount of material to remove (608). Hence, the balancing machine calculates the amount of mass required to be removed from a sheave 102 or 104 to create a clutch 100 that is within a balanced specification. In one embodiment, the machine uses a drill bit to drill out the calculated amount of material from the respective sheave member 102 or 104 (610) and then rechecks the value (606). Balancing of the clutch 100 reduces vibration during use and premature failures. Once the tied clutch 100 is balanced (606), it is removed from the balancing machine and the rotation shaft. It is then ready to be shipped to the customer assembled and pre-balanced (612).

Figure 7A:
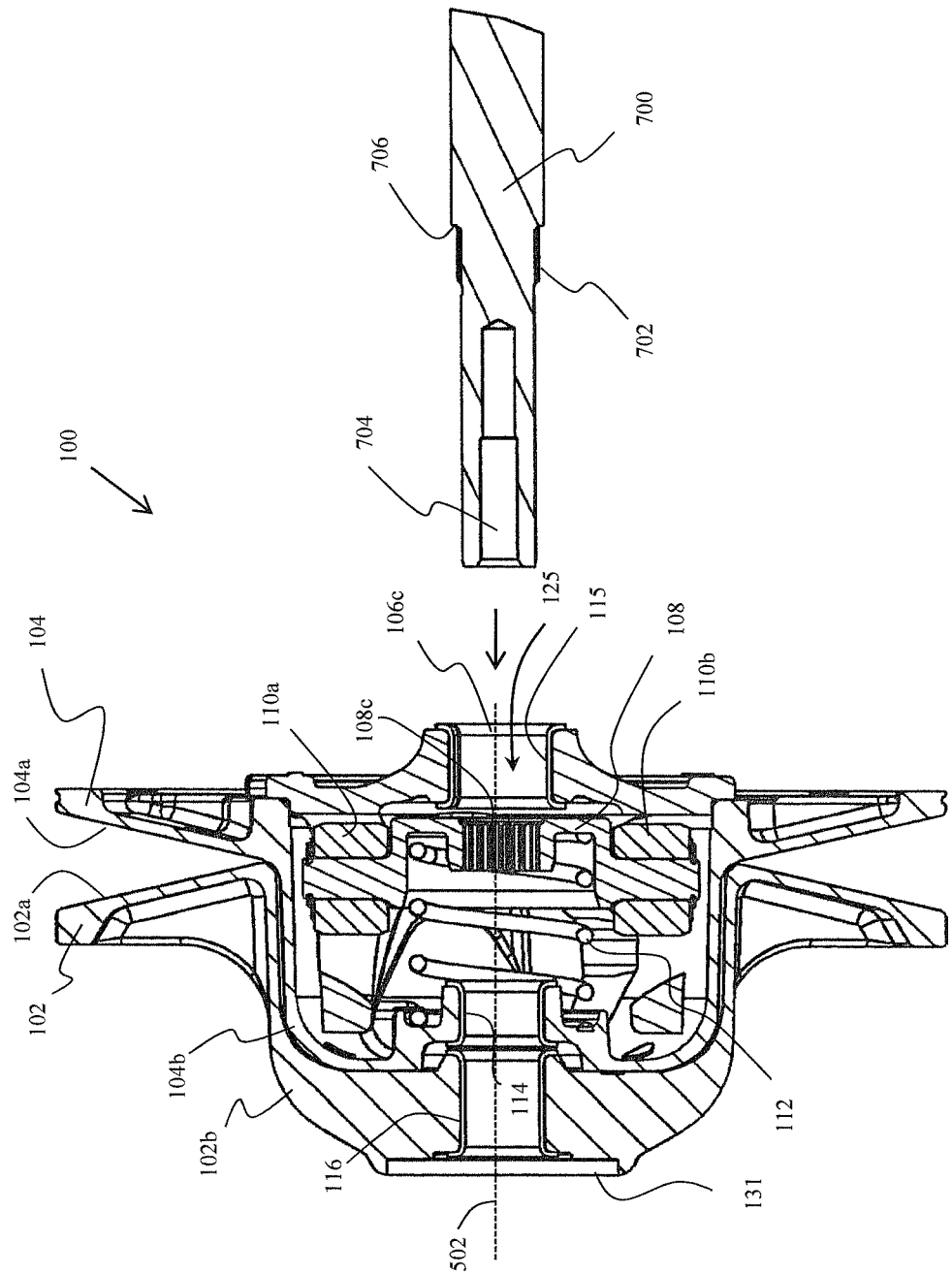
FIG. 7A is a cross-sectional side view of an assembled clutch of FIG. 1 and an input shaft of a transmission.
Figure 7B:
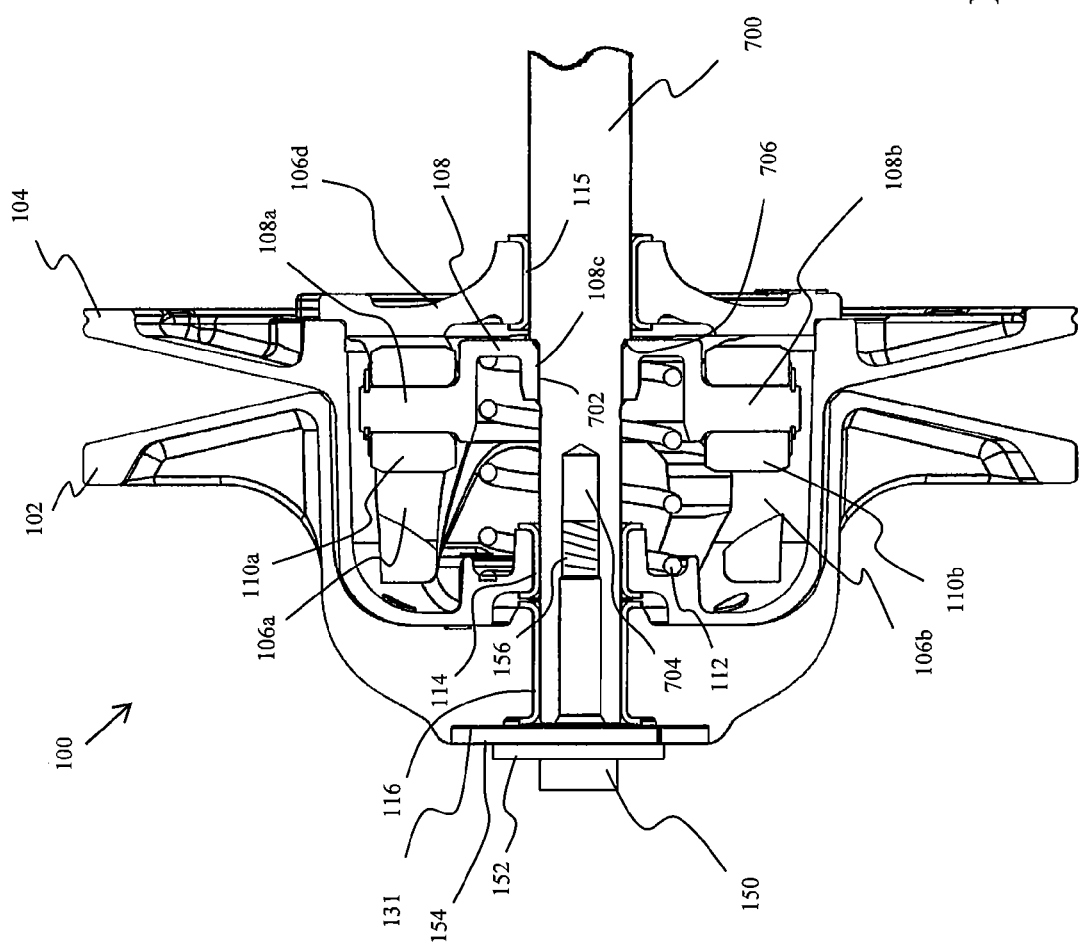
FIG. 7B is a cross-sectional side view of an assembled clutch of FIG. 1 and an input shaft of a transmission engaged with the clutch.

FIG. 7A illustrates an input shaft 700 of a transmission (not shown) that is aligned with a central passage 125 along the longitudinal rotational axis 502 formed in the clutch 100 that is accessed by the central opening 106c in the cover 106d of the cam assembly 106. The input shaft 700 of the transmission further includes exterior splines 702, a shoulder 706 and a central bore 704. The central bore 704 of input shaft 700 includes a threaded bore portion that selectively engages external threads 156 of a bolt 150 used to hold the shaft 700 in the clutch 100 via a load washer 152 and a thrust bushing 154 that is received in recess 131 of the first sheave 102, as illustrated in FIG. 7B. FIG. 7B illustrates the input shaft 700 of the transmission being received in the tied clutch 100. The exterior spline 702 of the input shaft 700 of the transmission engages the internal splines in the central passage 108c of the spider 108 such that rotation of the spider 108 rotates the transmission input shaft 700. As illustrated in FIG. 5B, the second central opening 102c in the first central hub 102b of the first sheave member 102 is aligned with a central opening 104h in the second hub 104b of the second sheave member 104. Further, the central opening 108c of the spider 108 and the central opening to the cam central opening 106c of the cam cover 106d are further aligned to form the central passage 125 to receive the input shaft 700 of the transmission. In the embodiment illustrated, bearings 116, 114 and 115 are used to engage surfaces of the input shaft 700. In particular, bearings 116 in the second central opening 102c of the first hub 102b engages a first surface portion of the input shaft 700, bearing 114 in central opening 104h of the second hub 104b of the second sheave member 104 engages another surface portion of the input shaft 700 and bearing 115 in central opening 106 to the cam cover 106d engages yet another surface portion of the input shaft 700.

In operation, the second (moving) sheave member 104 and the cam assembly 106 translates along a length of the input shaft 700 to either open up or close down a gap between the first and second conical faces 102a and 104a of the first and second sheaves 102 and 104. The interior gears (splines) of the spider 108 engage the splines 702 of the input shaft 700 therein locking rotation of the spider 108 with rotation of the input shaft 700. In addition, shoulder 706 of the input shaft 700 abuts an end surface of the spider 108 thereby preventing the spider 108 from translating along a length of the input shaft 700. As sheave 104 and the cam assembly 106 translate along the input shaft 700 there is a slight rotation relative to the input shaft 700. The first sheave 102, the second sheave 104 and the cam assembly 106 rotate together to the degree of the profile surfaces (helix) 302, 304 on the cam assembly 106. The faster the sheave 104 and cam assembly 106 rotates (i.e. the more torque applied), the more the biasing member 112 is compressed thereby increasing the force of the cam 108 on shoulder 706 of the input shaft 700 and the gap between the first and second conical faces 102a and 104a of the first and second sheaves 102 and 104 is widened.

Figure 8A:
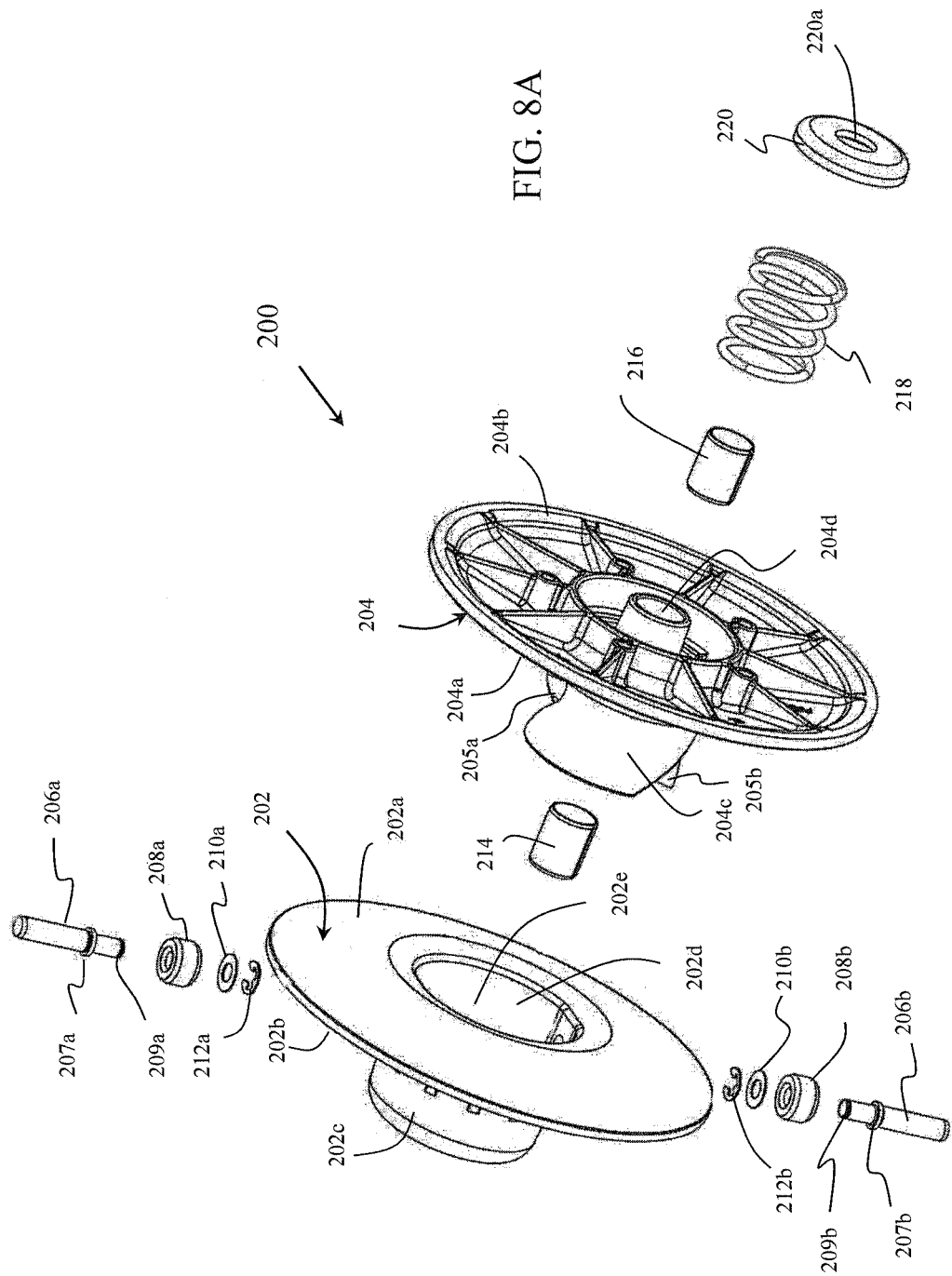
FIG. 8A is side perspective view of a cross-sectional side view of an unassembled continuous variable clutch of another embodiment of the present invention.

Referring to FIG. 8A an exploded side perspective view of another embodiment of a CVC 200 is illustrated. In this embodiment, a first (stationary) sheave member 202 is not tied together with a second (movable) sheave member 204. However, like the embodiment discussed above, this non-tied clutch 200 does not include a central post. The first sheave member 202 includes a hub 202c with a first opening 202d to a chamber 202e. A first conical-faced surface 202a of the first sheave member 202 extends radially from the first opening 202d. Opposite the first conical-faced surface 202a is a second surface 202b of the first sheave member 202. The hub 202c of the first sheave member 202 extends centrally generally in a perpendicular fashion from the second surface 202b of the first sheave member 202. The second sheave member 204 includes a second conical-faced surface 204a and a third surface 204b opposite the second conical-faced surface. The second sheave member 204 of this embodiment includes a cam assembly 204c. The cam assembly 204c extends centrally from the second conical-faced surface 204a in generally a perpendicular fashion. Hence, unlike the embodiment described above with a separate cam assembly 106, the cam assembly 204c in this embodiment is integrated into a hub of the second sheave member 204. The cam assembly 204c includes cam profile surfaces 205a and 205b similar to cam 106 described above.

Figures 8B, 8C:
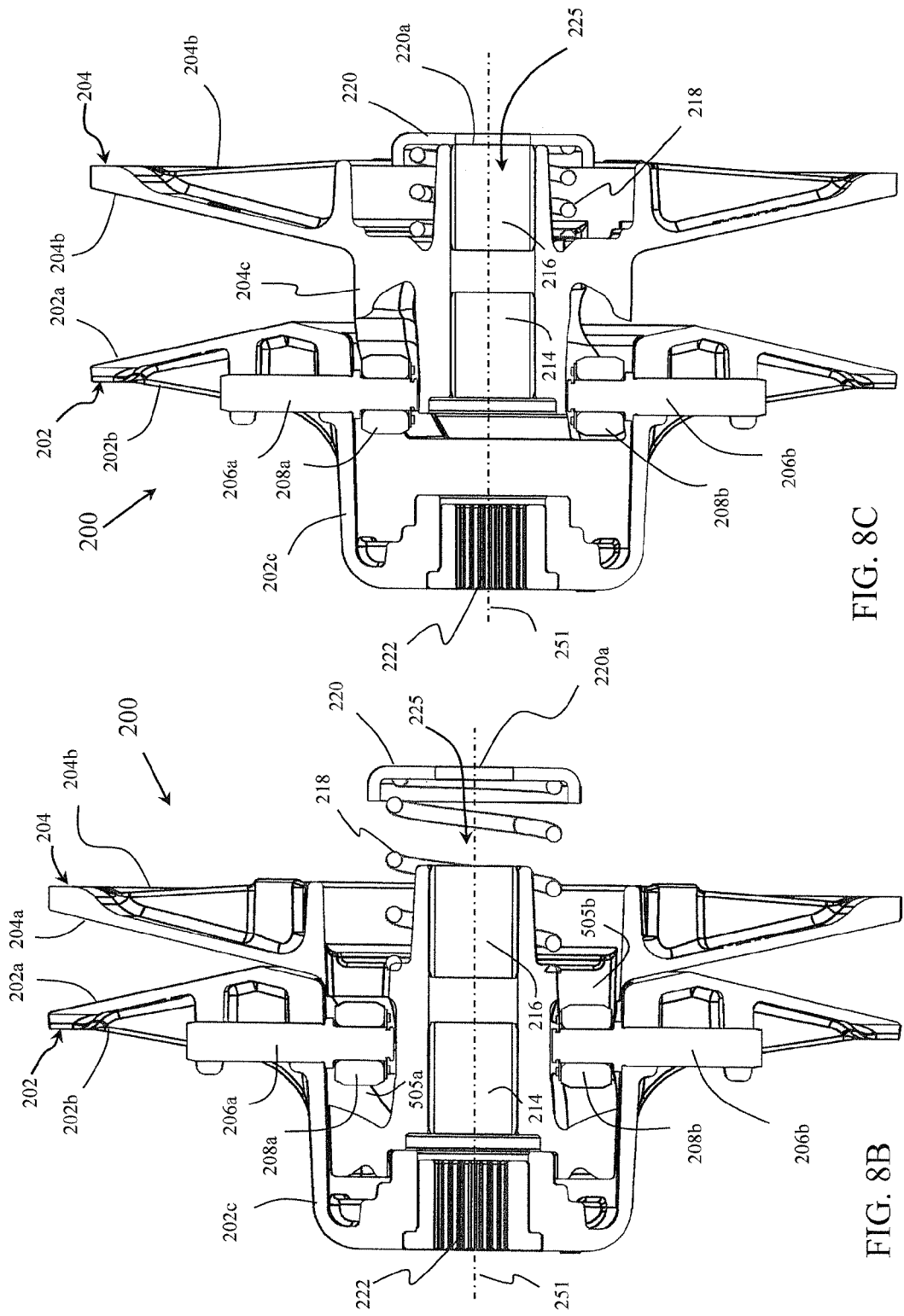
FIGS. 8B and 8C are cross-sectional side views of the clutch of FIG. 8A.

Cam holding rods 206a and 206b are coupled to the first sheave member 202 (this is further illustrated in FIGS. 8b and 8C). The Cam holding rods 206a and 206b hold respective cam rollers 208a and 208b. In particular, each cam roller 208a and 208b is posted on portion of a respective holding rod 206a and 206b. A washer 210a and 210b is then placed on the respective cam holding rod 206a and 206b. A C-clip 212a and 212b is then clipped in a respective groove 209a and 209b in the respective can holding rod 206a and 206b to hold the respective cam roller 208a and 208b on the respective cam holding rod 206a and 206b. Bearings 214 and 216 are positioned around inner surfaces of the second sheave member 204 to engage an input shaft of a transmission. Further illustrated in FIG. 8A are a biasing member 218 and a bias cap 220. The bias retaining cap 220a includes a central opening to receive an input shaft of a transmission. The bias retaining cap 220 is designed to abut an end of the biasing member 218. The cam holding rods 206a and 206b and cam rollers 208a and 208b are assembled to the first sheave member 202 in one embodiment through the first opening 202d and into the chamber 202e of the first sheave member 202.

Figure 9A:
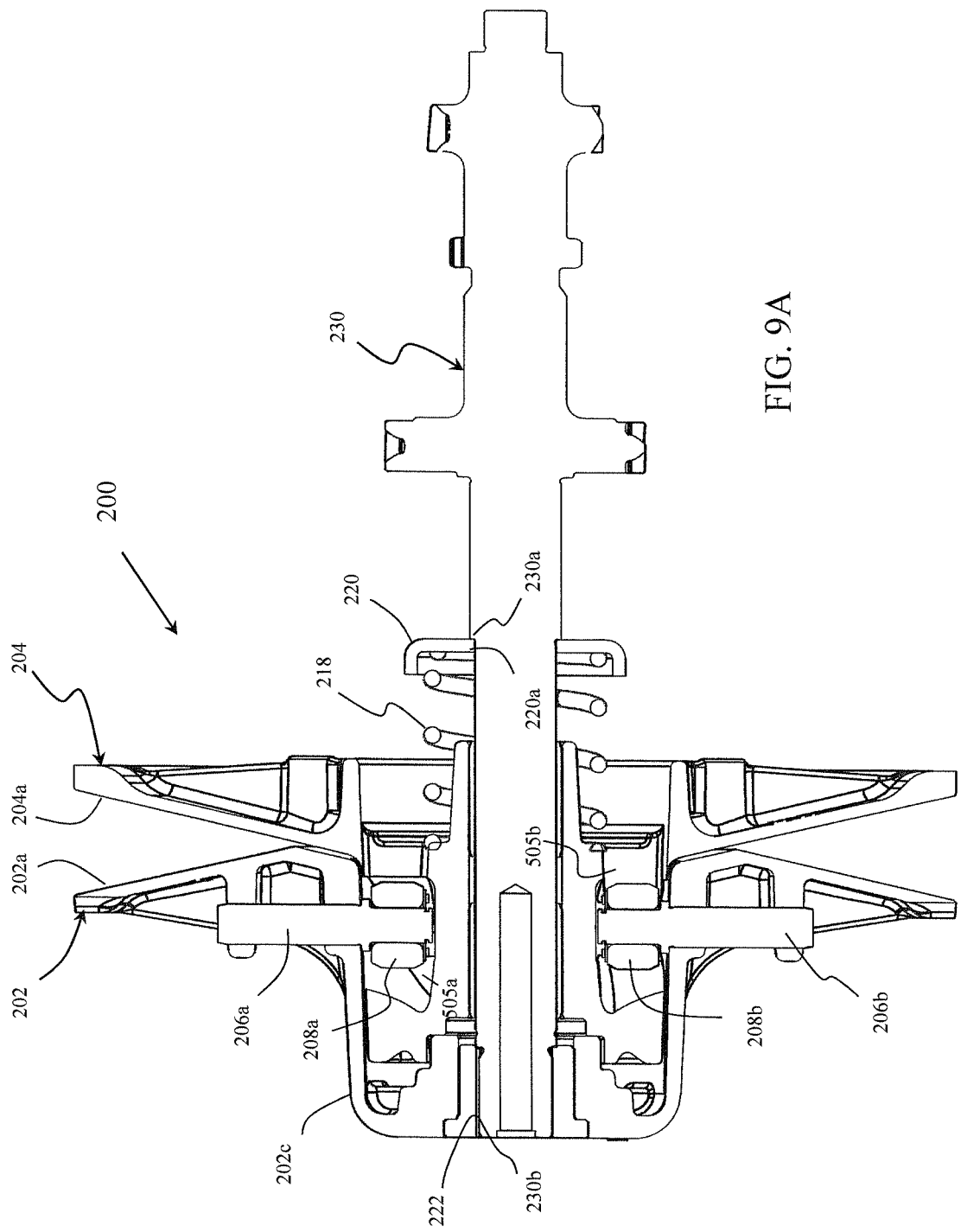
FIGS. 9A and 9B are cross-sectional side views of the clutch of FIG. 8A engaged with an input shaft of a transmission.
Figure 9B:
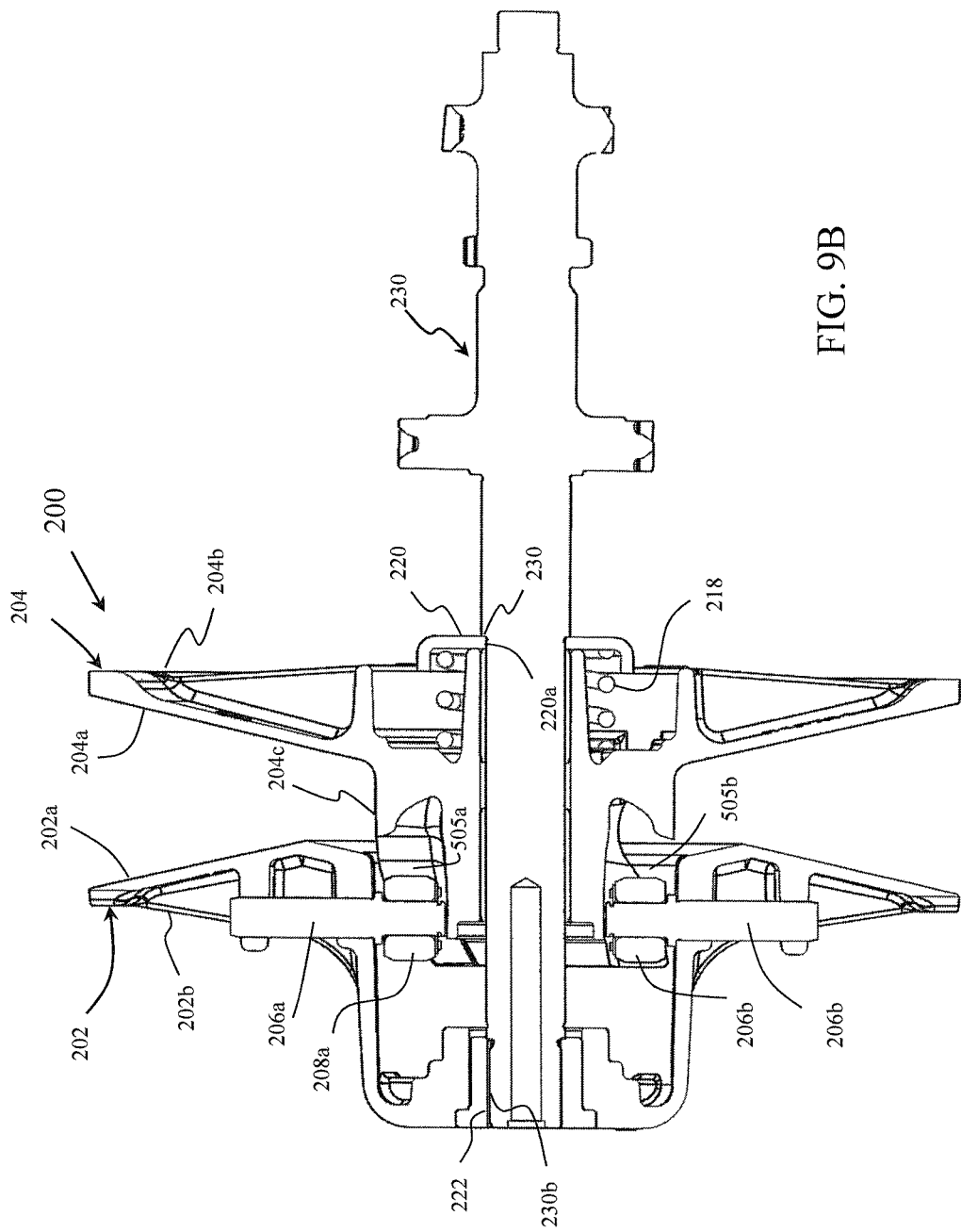

FIGS. 8B and 8C illustrates a cross-sectional side view of clutch 200. In particular, FIG. 8A illustrated the first and second conical faced surfaces 202a and 204a of the first and second sheave members 202 and 204 being positioned near each other. FIG. 8C illustrates the first and second conical faced surfaces 202a and 202b of the first and second sheave members 202 and 204 being positioned apart from each other (which would happen as torque on the clutch 200 increases). In this embodiment, the clutch 200 comes in four different parts that are assembled on an input shaft to a transmission. The four parts are the bias retaining cap 220, the bias member 218, the second (movable) sheave member 204 and the first (stationary) sheave member 202. Similar to clutch 100 discussed above, this embodiment also forms a central passage 225 along a longitudinal axis 251 that is configured to receive an input shaft of a transmission as illustrated in FIGS. 9A and 9B. Referring to FIGS. 9A and 9B cross-sectional illustrations of the clutch 200 coupled to an input shaft 230 of a transmission (not shown) is illustrated. In particular, FIG. 9A illustrates, the first and second conical faced surfaces 202a and 202b of the first and second sheave member 202 and 204 being positioned near each other. FIG. 9B illustrates the first and second conical faced surfaces 202a and 202b of the first and second sheave member 202 and 204 being positioned apart from each other (which would happen as the torque on the clutch 200 increases). As illustrated in FIGS. 9A and 9B, an end surface about the central opening 220a of the bias retaining cap 220 abuts a shoulder 230a of the input shaft 230 to retain the bias retaining cap 220 in a static position in relation to the input shaft 230. Splines 230b proximate an end of the input shaft 230 engage interior gear (splines) 222 of the first sheave member 202 to lock rotation of input shaft 230 with rotation of the clutch 200. Movement of the second (movable) sheave member 204 along the length of the input shaft 230 in relation to the first (stationary) sheave member 202 is similar to that described above in regards to clutch 100. In the clutch 200 embodiment, the clutch 200 is balanced by first mounting the four pieces as described above on a test input shaft and then balanced as described above in FIG. 6. Once, the balancing is complete, the clutch 200 is unassembled from the test input shaft and packaged for sale.

Figure 10:
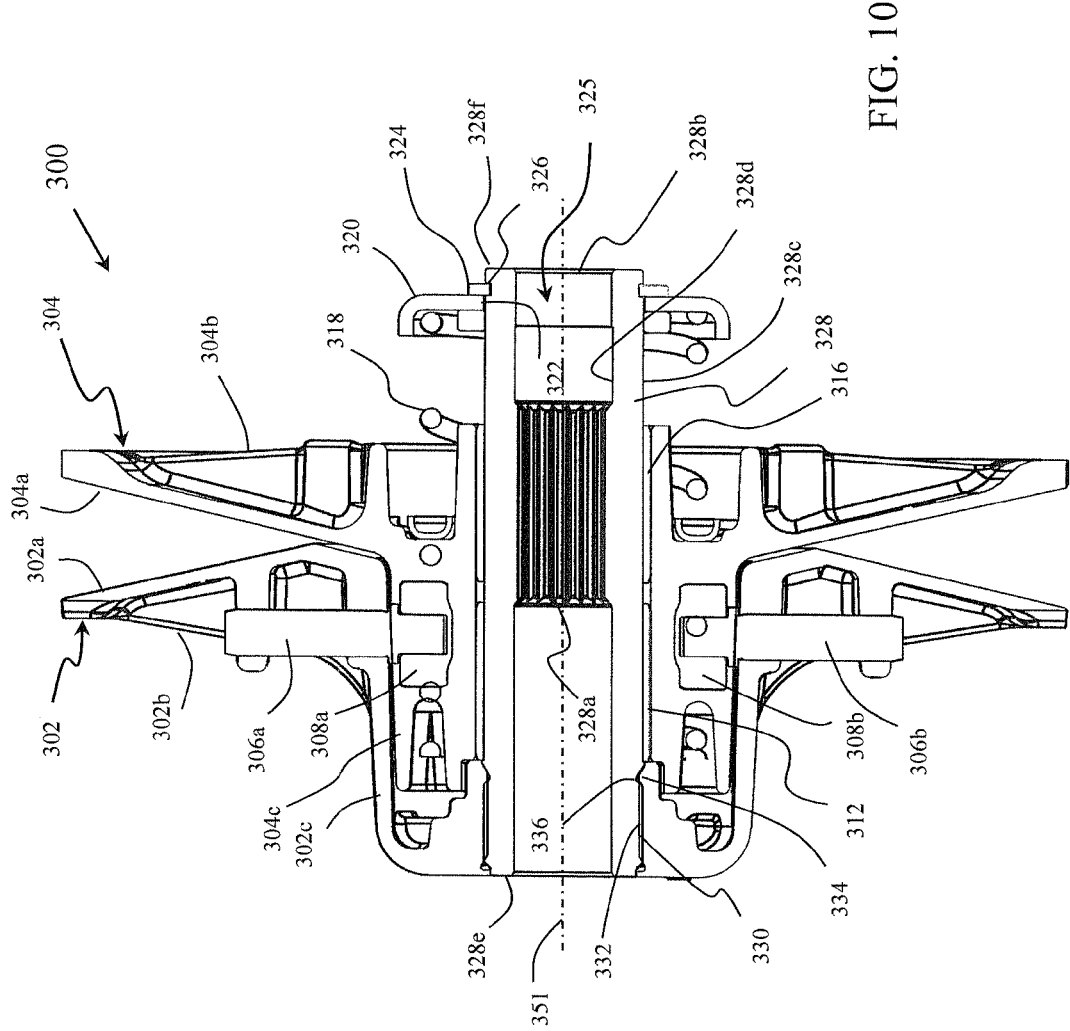
FIG. 10 is a cross-sectional side view of yet another embodiment of a continuously variable clutch of another embodiment of the present invention.

FIG. 10 illustrates yet another embodiment of an untied CVC 300. Similar to clutch 200, clutch 300 includes a first (stationary) sheave member 302 and a second (movable) sheave member 304 that has a cam assembly 304c for a hub. In particular, the first sheave member 302 includes a first conical-faced surface 302a, a second surface 302b opposite the first conical-faced surface 302a and a hub 302c centrally extending from the second surface in generally a perpendicular fashion. Cam holding rods 306a and 306b are coupled to the first sheave member 302. The Cam holding rods 306a and 306b in turn rotationally hold cam rollers 308a and 308b. The cam rollers 308a and 308b engage respective cam profiles in the cam assembly 304c of the second sheave member 304 that is received in the hub 302c of the first sheave member 302. The second sheave member 304 further includes a second conical-faced surface 304a that extends from the cam assembly 302c and a third surface 304b that is opposite the second conical faced surface 304a.

Clutch 300 further includes a tubular translate support 328 that holds the first sheave member 302, the second sheave member 304, the biasing member 318 and the bias retaining cap 320 together as one unit. The translate support includes an outer surface 328c and an inner surface 328d. In the embodiment of FIG. 10, bearings 312 and 316 are positioned between the second sheave member 304 and the outer surface 328c of the translate support 328. A section of the outer surface 328c of the translate support 328 near a first end 328e of the translate support 328 includes external splines 332 that engage internal splines 330 of the hub 302c of the first sheave member 302 to lock rotation of the translate support 328 with rotation of the first sheave member 302. A first groove 336 in the outer surface 328c of the translate support 328 receiving a protrusion in the hub 302c of the first sheave member 302 retains the translate support 328 within the clutch 300. The first groove 336 in this embodiment is near the first end 328e of the translate support 328. The outer surface 328c of the translate support 328 includes a second groove 326 that is proximate a second end 328f of the translate support 328. A C-clip 324 fits in the second groove 326 to retain the bias retaining cap 324 in a static position on the translate support 328. As illustrated In FIG. 10, the bias retaining cap 324 has a central opening 322 that receives the translate support 328. The translate support 328 further has an opening 328b to a central passage 325 along a longitudinal rotational axis 351 of the clutch 300 that is designed to receive a transmission input shaft (not shown). Spines on the input shaft engage interior spines 328a on the inner surface 328d of the translate support 328 to lock rotation of the transmission input shaft to the rotation of the translate support 328. Balancing of clutch 300 is done similar to that described in regards to FIG. 6 above. Clutch 300 provides an untied clutch 300 that can be pre-balanced and be pre-assembled.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuous variable clutch comprising:
 a first sheave member including a first central hub and a first conical-faced surface extending radially from the first central hub, the first central hub forming a cavity;
 a second sheave member including a second central hub and a second conical-faced surface extending radially from the second central hub, the second central hub of the second sheave member received in the cavity of the first central hub such that the first conical-faced surface of the first sheave member faces the second conical-faced surface of the second sheave member, the second central hub of the second sheave member further configured to move axially within the first central hub of the first sheave member based on an amount of torque on the continuous variable clutch to vary a gap distance between the first and second conical-faced surfaces, the first sheave member and the second sheave member further forming a central passage to receive an input shaft of a transmission;
 a biasing member having a first end and a second end, the first end of the biasing member positioned within the second central hub and applying a biasing force on the second central hub of the second sheave member; and
 a bias retaining cap having a surface configured and arranged to engage the second end of the biasing member, the bias retaining cap positioned outside of the second central hub of the second sheave member.

2. The continuous variable clutch of claim 1, wherein the central passage formed by the first and second sheave members includes internal splines configured to engage external splines on the input shaft of the transmission to lock rotation of the input shaft of the transmission with the rotation of the continuous variable clutch.

3. The continuous variable clutch of claim 1, further comprising:
 at least one bearing in the formed central passage.

4. The continuous variable clutch of claim 1, further comprising:
 a tubular translate support coupled in the central passage, the tubular translate support having an internal spline portion configured to engage an external spline portion on the input shaft of the transmission to lock rotation of the input shaft of the transmission with the rotation of the continuous variable clutch.

5. The continuous variable clutch of claim 4, wherein the second sheave member translates axially along an outer surface of the translate support.

6. The continuous variable clutch of claim 4, further comprising:
 the bias retaining cap having a central opening, the central opening of the bias retaining cap receiving the tubular translate support.

7. The continuous variable clutch of claim 1, further comprising:
 at least one cam roller, the cam roller fixed at a static axial position in relation to the first sheave member;
 a cam assembly including at least one cam profile, the at least one cam roller configured to engage at least one cam profile, wherein the position of the at least one cam roller in the at least one cam profile determines the gap distance between the first conical-faced surface and the second conical faced surface of the first and second sheave members; and
 the biasing member configured to apply a biasing force on the cam assembly.

8. The continuous variable clutch of claim 7, wherein the cam assembly is integrated into the second central hub of the second sheave member.

9. The continuous variable clutch of claim 1, further comprising:
 a connector operatively connecting the first sheave member to the second sheave member, the connector allowing movement axially between the first and second sheave members while preventing rotational movement between the first and second sheave members, wherein the first and second sheave members rotate together without relative rotation as the second sheave member moves longitudinally.

* * * * *